United States Patent
Sammeta et al.

(10) Patent No.: US 9,728,848 B1
(45) Date of Patent: Aug. 8, 2017

(54) ADAPTIVE NEUTRALIZATION LINE TO COUNTER ENVIRONMENTAL EFFECTS FOR ULTRA-HIGH ISOLATION

(71) Applicant: AMAZON TECHNOLOGIES, INC., Seattle, WA (US)

(72) Inventors: Rohit Sammeta, Mountain View, CA (US); Peruvemba Ranganathan Sai Ananthanarayanan, Sunnyvale, CA (US); Adrian Napoles, Cupertino, CA (US); Anuj Dron, San Jose, CA (US); Mercyma Deeba Balachandran, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/667,211

(22) Filed: Mar. 24, 2015

(51) Int. Cl.
  *H01Q 11/02* (2006.01)
  *H04B 1/04* (2006.01)
  *H04B 7/00* (2006.01)
  *H01Q 1/52* (2006.01)
  *H04B 1/40* (2015.01)

(52) U.S. Cl.
  CPC .............. *H01Q 1/521* (2013.01); *H04B 1/40* (2013.01)

(58) Field of Classification Search
  CPC .......... H01Q 1/521; H01Q 1/243; H01Q 1/52; H01Q 1/523; H01Q 1/525; H01Q 21/28; H01Q 5/35; H04B 1/40
  USPC ................... 455/101, 121, 129, 278.1, 575.7
  See application file for complete search history.

(56) References Cited

U.S. PATENT DOCUMENTS

| | | | | |
|---|---|---|---|---|
| 6,535,084 B1 * | 3/2003 | Tropp | ....................... | H01P 7/00 324/318 |
| 7,366,244 B2 * | 4/2008 | Gebara | ................... | H01Q 1/521 375/259 |
| 9,369,187 B1 * | 6/2016 | Sammeta | ............... | H01Q 23/00 |
| 2011/0175789 A1 * | 7/2011 | Lee | ......... | H01Q 1/243 343/853 |
| 2011/0175792 A1 * | 7/2011 | Yoon | ...................... | H01Q 1/521 343/893 |
| 2011/0237207 A1 * | 9/2011 | Bauder | .................. | H01Q 1/521 455/78 |
| 2011/0256857 A1 * | 10/2011 | Chen | ..................... | H04B 1/525 455/422.1 |
| 2012/0013519 A1 | 1/2012 | Håkansson et al. | | |
| 2013/0057438 A1 * | 3/2013 | Satou | ..................... | H01Q 1/243 343/702 |

(Continued)

*Primary Examiner* — Simon Nguyen
(74) *Attorney, Agent, or Firm* — Lowenstein Sandler LLP (57) ABSTRACT

Devices or apparatuses for changing settings of a neutralization line are described. A radio device may include a neutralization line coupled between a first antenna and a second antenna. The neutralization line has a variable component and the first and the second antennas are electromagnetically coupled and have a first coupling value. The neutralization line is controlled by a controller. The controller is coupled to the first antenna port, the second antenna port and the neutralization line. The controller detects an environmental condition that causes the first coupling value increase to a second coupling value. The controller also adjusts a value of the variable component to change a resistance value or, a reactance value, or both of the adaptive neutralization line to achieve a third coupling value that is lower than the second coupling value.

19 Claims, 8 Drawing Sheets

(56) References Cited

U.S. PATENT DOCUMENTS

| | | | |
|---|---|---|---|
| 2013/0057446 A1* | 3/2013 | Hirobe | H01Q 1/243 |
| | | | 343/851 |
| 2013/0207854 A1* | 8/2013 | Ryu | H01Q 5/35 |
| | | | 343/702 |
| 2013/0315116 A1 | 11/2013 | Chen et al. | |
| 2014/0011460 A1* | 1/2014 | Ali | H01Q 1/243 |
| | | | 455/75 |
| 2014/0113679 A1* | 4/2014 | Wehrmann | H04B 1/0458 |
| | | | 455/550.1 |
| 2015/0116159 A1* | 4/2015 | Chen | H01Q 5/22 |
| | | | 343/702 |
| 2016/0190700 A1* | 6/2016 | Wang | H01Q 1/38 |
| | | | 343/700 MS |

\* cited by examiner

ADAPTIVE NEUTRALIZATION LINE TO COUNTER ENVIRONMENTAL EFFECTS FOR ULTRA-HIGH ISOLATION

BACKGROUND

A large and growing population of users is enjoying entertainment through the consumption of digital media items, such as music, movies, images, electronic books, and so on. The users can use a variety of electronic devices to consume such media items. The electronic devices (e.g., user devices) can be electronic book readers, cellular telephones, personal digital assistants (PDAs), portable media players, tablet computers, netbooks, laptops, and so forth. The user devices can wirelessly communicate with a communications network to consume the digital media items. To wirelessly communicate with other devices, these electronic devices can include multiple antennas configured to communicate on one or more types of communication networks, such as a communications network using the Bluetooth® technology, the Zigbee® technology, the Wi-Fi® technology, or a cellular communications network.

When antennas may be in close proximity to each other, signal interference, signal distortion, and mutual coupling may occur. For example, mutual coupling can be undesirable because energy that is intended to be transmitted (e.g., radiated away) to another device may be absorbed by another antenna of the transmitting device. Similarly, energy that that may be intended to be received by an antenna of a receiving device may be absorbed (e.g., captured) by another antenna. Signal interference, signal distortion, and mutual coupling can reduce the antenna efficiency and performance of antennas to transmit or receive data.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Many electronic devices may have multiple antennas configured to transmit and/or receive signals at different frequencies or for different types of communications networks. For example, an electronic device can have a personal area network (PAN) antenna configured to receive signals based on an Institute of Electrical and Electronics Engineers (IEEE) 802.15.4 standard, released by the ZigBee® Alliance and commonly referred to as ZigBee® wireless technology and a wireless local area network (WLAN) antenna configured to receive signals based on an IEEE 802.11 standard, released by the Wi-Fi® alliance and commonly referred to as the Wi-Fi® wireless technology. Examples of such user devices can include electronic book readers, portable digital assistants, mobile phones, laptop computers, portable media players, tablet computers, cameras, video cameras, netbooks, notebooks, desktop computers, gaming consoles, DVD players, media centers, smart speaker device, voice-controlled devices, set-top boxes, and so forth. When antennas may be in close proximity, the antennas may mutually couple, causing an absorption or distortion by a second antenna of a signal transmitted or received by a first antenna approximate the second antenna. For example, a signal transmitted by the first antenna can be partially absorbed by the adjacent second antenna, causing distortion or weakening of the signal. In another example, a signal intended to be received by the first antenna can instead be at least partially absorbed by the adjacent second antenna, causing distortion or weakening of the signal. Mutual coupling can reduce the antenna efficiency and performance of antennas when transmitting and/or receiving signals.

Traditionally, to reduce signal distortion, signal interference, and mutual coupling between antennas, antennas can be isolated or separated by a threshold distance and/or by radiofrequency (RF) shielding between the antennas. However, for electronic devices, such as portable devices with relatively small form factors, arranging the antennas to achieve the threshold distance separation or shielding can be difficult.

Aspects of the present disclosure address the above noted deficiency by using adaptive neutralization lines between antennas to enhance isolation and reduce mutual coupling and distortion between the antennas. To account for environmental effects, instead of using static neutralization lines, adaptive neutralization lines can be used to correct for the effects of mutual coupling and signal distortion in different environments by varying a resistance of the adaptive neutralization lines (e.g., to control an amplitude of the adaptive neutralization lines) and a reactance of the adaptive neutralization lines (e.g., to control a phase of the adaptive neutralization lines). For example, transmission line and the components of the adaptive neutralization lines can be varied to control a null of the neutralization line. That is, the adaptive neutralization line can control a location of the null and a depth of the null to account for the environmental effects. An advantage of the adaptive neutralization lines can be to achieve an ultra-high isolation between the antennas (such as 50 decibel isolation).

Figure 1A:
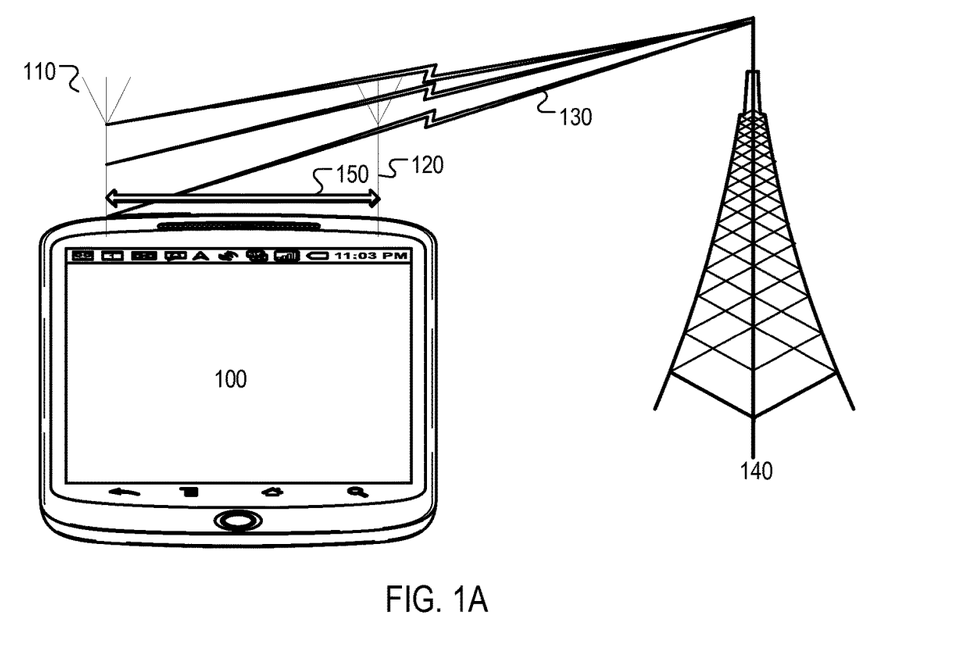
FIG. 1A illustrates a user device with a first antenna communicating a signal with a transceiver antenna according to one embodiment.

FIG. 1A illustrates a user device 100 with a first antenna 110 communicating a signal 130 with a transceiver antenna 140 according to one embodiment. A second antenna 120 can absorb at least a portion of the signal 130 communicated between the first antenna 110 and the transceiver antenna 140. The first and second antennas 110 and 120 can be separated by a distance 150 to reduce mutual coupling and interference between the first and second antennas 110 and 120. However, the second antenna 120 may still interfere with at least a portion of the signal 130 communicated between the transceiver antenna 140 and the first antenna 110 by absorbing the signal 130.

Figure 1B:
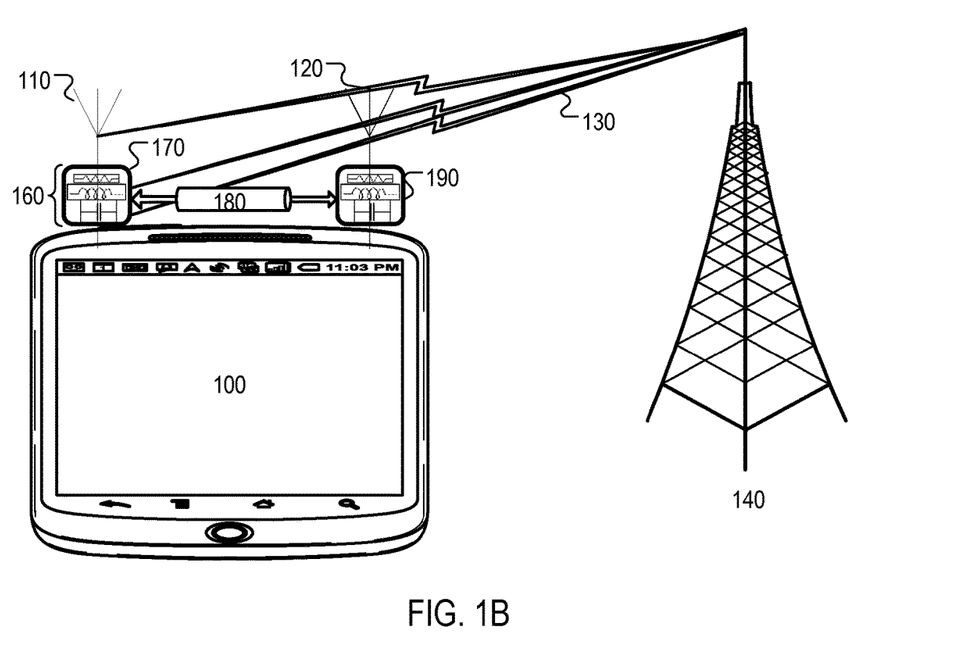
FIG. 1B illustrates a user device with an adaptive neutralization line between a first antenna and a second antenna according to one embodiment.

FIG. 1B illustrates the user device 100 with an adaptive neutralization line 160 between the first antenna 110 and the second antenna 120 according to one embodiment. The adaptive neutralization line 160 can be an auxiliary connection between the first and second antennas 110 and 120 to cancel out or filter the mutual coupling and interference between the first and second antennas 110 and 120 to produce ultra-high levels of isolation. The adaptive neutralization line 160 can include a transmission line 180, a first RLC component 170, and a second RLC component 190. The transmission line 180 can connect the first RLC component 170 and the second RLC component 190 to conduct resonant currents between the first RLC component 170 and the second RLC component 190 to at least partially cancel mutual coupling and interference between the first antenna 110 and the second antenna 120. The transmission line 180 can be configured to phase shift the conducted resonant currents to cause at least partial cancellation of the signal 130 received by the first antenna 110 and the second antenna 120.

In one example, a controller can vary a resistance and reactance of the transmission line 180 and adjust the RLC components 170 and 190 to control the null of the adaptive neutralization line 160, in view of the effects of the environment, to maintain a threshold isolation level between the first and second antennas 110 and 120. An advantage of varying the resistance and reactance of transmission line 180 and the RLC components 170 and 190 can be to maintain a threshold isolation level (e.g., a threshold decoupling or de-correlation level) between the first and second antennas 110 and 120 as an environment that the user device 100 may be used in varies.

Figure 1C:
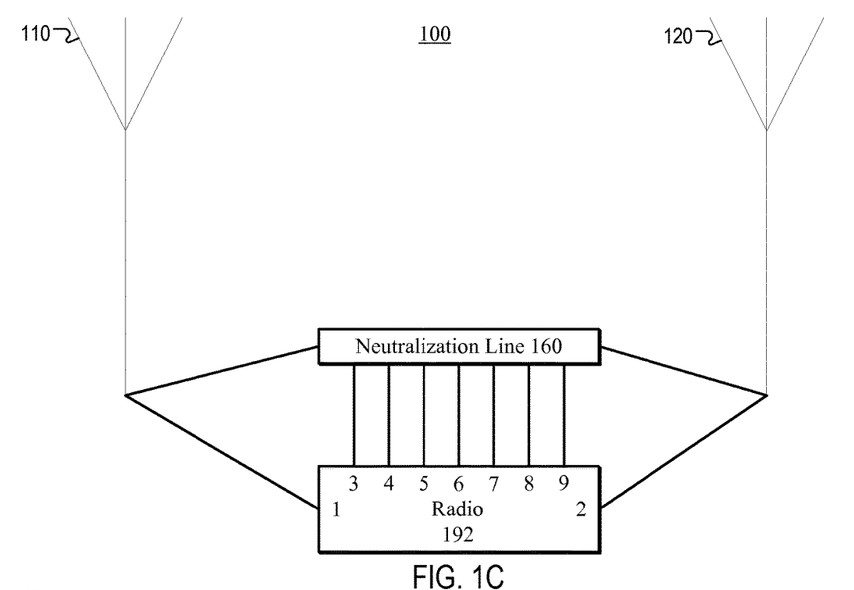
FIG. 1C illustrates a user device configured to determine an isolation level between a first antenna and a second antenna according to one embodiment.

FIG. 1C illustrates a user device 100 configured to determine an isolation level between the first antenna 110 and the second antenna 120 according to one embodiment. The user device 100 can include a radio 192 (such as a transceiver), the first and second antennas 110 and 120, and an adaptive neutralization line 160. The radio 192 can be coupled to the first and second antennas 110 and 120 to communicate information with another device. The adaptive neutralization line 160 can be coupled to the radio 192 and can connect the first and second antennas 110 and 120. The radio 192 can include a controller to direct signals to the antennas 110 and 120 via interfaces (pins or ports 1 and 2) of the radio 192. For example, interfaces 1 and 2 can receive and transmit signals via the first and second antennas 110 and 120. The controller can also control variable components of the adaptive neutralization line 160 via interfaces 3-9. In one example the interfaces 1-9 can be pin-outs of the radio 192. In another example, the interfaces 1-9 can be control lines of the radio 192. In another example, the adaptive neutralization line 160 includes a variable transmission line and one or more variable components that are controllable by the controller to reduce mutual coupling and increase isolation between the first antenna and the second antenna. In one example, the variable transmission line and the variable component are set according to a first set of variable settings in a first state (e.g., a previous state than the current state when the current state is determined to be different). The variable settings may be different lengths of the variable transmission line, values for variable components, or both, which are used to set the particular length and particular values of the variable components to achieve the desired isolation between the antennas. The controller can determine a current state of the electronic device using various inputs, such as a measurement from a sensor, as described herein. The controller determines that the current state is different than the previous state, i.e., the current state is different than the first state. The controller can identify, in a look-up table stored in a memory device coupled to the controller, a second set of variable settings to reconfigure the adaptive neutralization line for the current state. The controller changes the first set of variable settings to the second set of variable settings to reconfigure the adaptive neutralization line for the current state.

The controller can measure an isolation level between the first and second antennas 110 and 120 by transmitting a signal using the first antenna 110 and monitoring the second antenna 120 to determine when the second antenna 120 receives the signal and the signal strength of the received signal. The controller can use the signal strength to determine an isolation level between the first and second antennas 110 and 120.

Figure 1D:
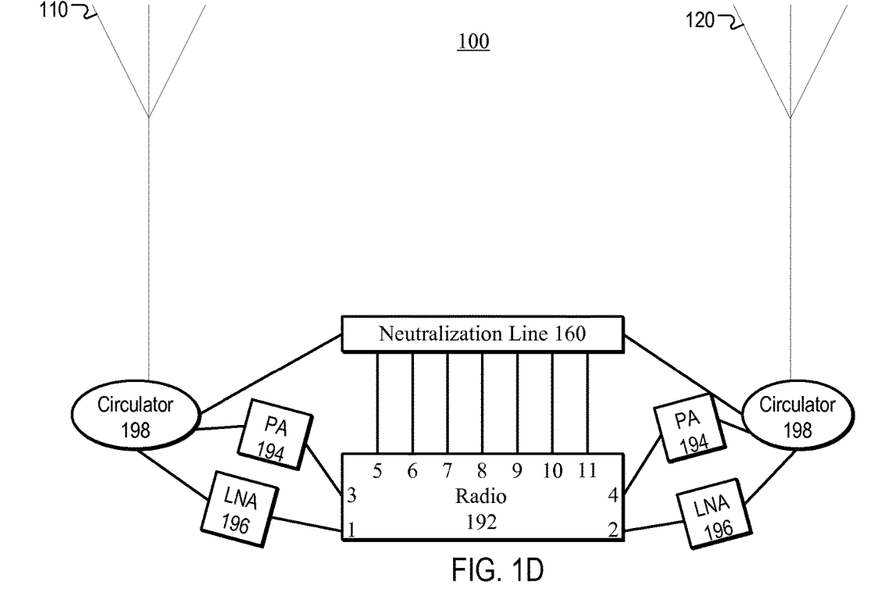
FIG. 1D illustrates a user device configured to determine an isolation level between a first antenna and a second antenna according to one embodiment.

FIG. 1D illustrates a user device 100 configured to determine an isolation level between the first and second antennas 110 and 120 according to one embodiment. The user device 100 can include a radio 192, the antennas 110 and 120, and an adaptive neutralization line 160. The radio 192 can be coupled to the antennas 110 and 120 via a power amplifier (PA) 104 or a low noise amplifier (LNA) 196 coupled to a circulator 198. In one example, the radio 192 can transmit signals to another device by sending a signal from an interface 3 or 4 to the PA 194 coupled to the circulator 198. In this example, the circulator 198 can direct the signal to the first antenna 110 or the second antenna 120, respectively. In another example, the radio 192 can receive signals from another device by receiving the signal at an interface 1 or 2 from the LNA 196 coupled to the circulator 198. In this example, the circulator 198 can relay the signal from the first antenna 110 or the second antenna 120, respectively, via the LNA 196 to the interface 1 or 4. The radio 192 can include a controller to control variable components of the adaptive neutralization line 160 via interfaces 5-11. For example, the variable components can be variable resistors, capacitors, and/or inductors and the controller can vary the variable components. In another example, the interfaces 1-11 can be pin-outs of the radio 192. In another example, the interfaces 1-11 can be control lines of the radio 192.

In one example, the controller can passively measure the isolation level between the first antenna 110 and the second antenna 120 by transmitting a signal from the first antenna 110 and monitoring the second antenna 120, as discussed above. In another example, the controller can measure the isolation level between the first and second antennas 110 and 120 when the first and second antennas 110 and 120 may both be transmitting. In this example, the controller can monitor interface 1 to determine an actual return loss of the first antenna 110 and can monitor interface 2 to determine an actual return loss of the second antenna 120. The controller can compare the actual return losses of the first and second antennas 110 and 120 to a predetermined return loss value for the first and second antennas 110 and 120 to determine an isolation level between the first and second antennas 110 and 120. An advantage of determining the isolation level of the first and second antennas 110 and 120 by comparing the return loss values can be to determine an isolation level between the first and second antennas 110 and 120 as the radio 192 may be transmitting signals using the first and second antennas 110 and 120.

Figure 2:
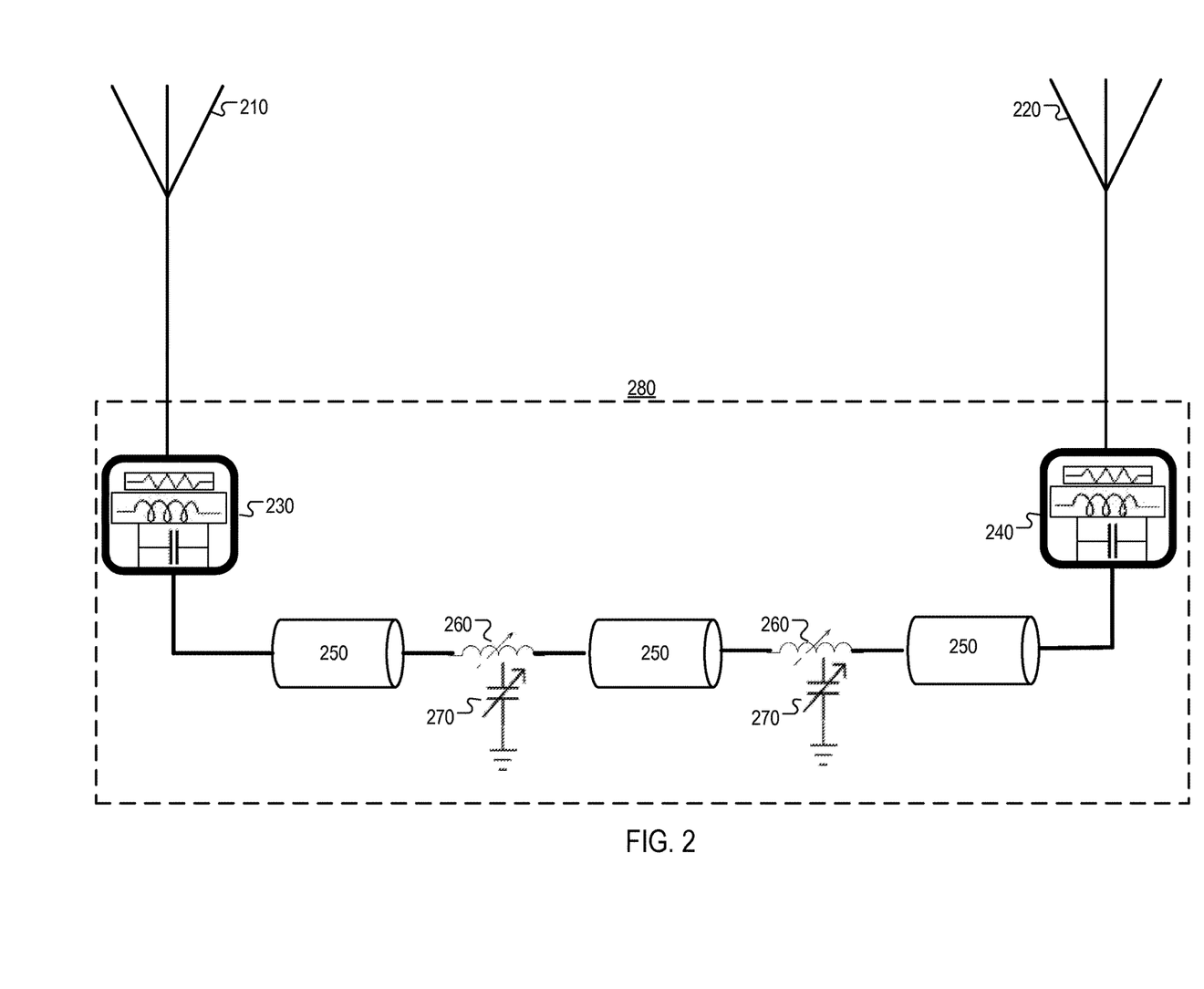
FIG. 2 illustrates a first antenna and a second antenna connected by an adaptive neutralization line with a controller according to one embodiment.

FIG. 2 illustrates a first antenna 210 and a second antenna 220 connected by an adaptive neutralization line with a controller 280 according to one embodiment. The controller 280 can adjust variable components of the first and second antennas 210 and 220. The variable components can include: RLC components 230, transmission lines 250, variable inductors 260, and/or variable capacitors 270 of the adaptive neutralization line. The variable components of the adaptive neutralization line may include other variable components, such as an adjustable resistor. The list of variable components is not an exhaustive list, but rather an exemplary list of components that may be adjusted by the controller 280.

The controller 280 can monitor an isolation level between the first antenna 210 and the second antenna 220 and adjust the variable components to maintain a threshold isolation level in view of different states or environments that a user device may operate in. In one example, the threshold isolation level can be a predetermined isolation level that the user device may operate at. In another example, the threshold isolation level can be an adjustable isolation level. In another example, the threshold isolation level can be adjusted based on user defined parameters, such as a quality of service level or a signal strength level. In another example, when the isolation level between the first and second antennas 210 and 220 falls below the threshold isolation level, the controller 280 can vary the variable components to increase the isolation level above the threshold isolation level. The controller can vary the variable components based on look-up table adjustment values and/or an algorithm as discussed in the proceeding paragraphs.

The different states that the user device may operate in (e.g., current states and new states) can include: an environment that the user device may be operating in; the user device operating adjacent to a metallic object; a movement of the user device from a location; the user device operating in a vertically upright position; and the user device operating when located adjacent to a user. The environments that the user device can operate in can include: a dielectric environment, such as an environment with porcelain, mica, glass, plastics near the user device; the dielectric environment where the user device may be moving; an environment where the user device is operating near a metal object and the user device may be moving; and so forth. The controller 280 can determine the different states of the user device using one or more sensors (e.g., the sensor takes measurements), including: an optical sensor, such as a camera; an accelerometer; a clock or timer; a temperature sensor, such as a thermostat; a pressure sensor; a touch sensor, such as a capacitive or resistive touch screen; a location sensor, such as a global positioning system (GPS) sensor or a triangulation sensor; a frequency sensor; a gyroscope; a grip sensor; an audio sensor, such as a microphone; and so forth. For example, the user device can determine that the user device is in the vertically upright position using the accelerometer and/or the gyroscope. In another example, the user device can determine when a metal object is on top of the user device using the capacitive touch screen.

Figure 3:
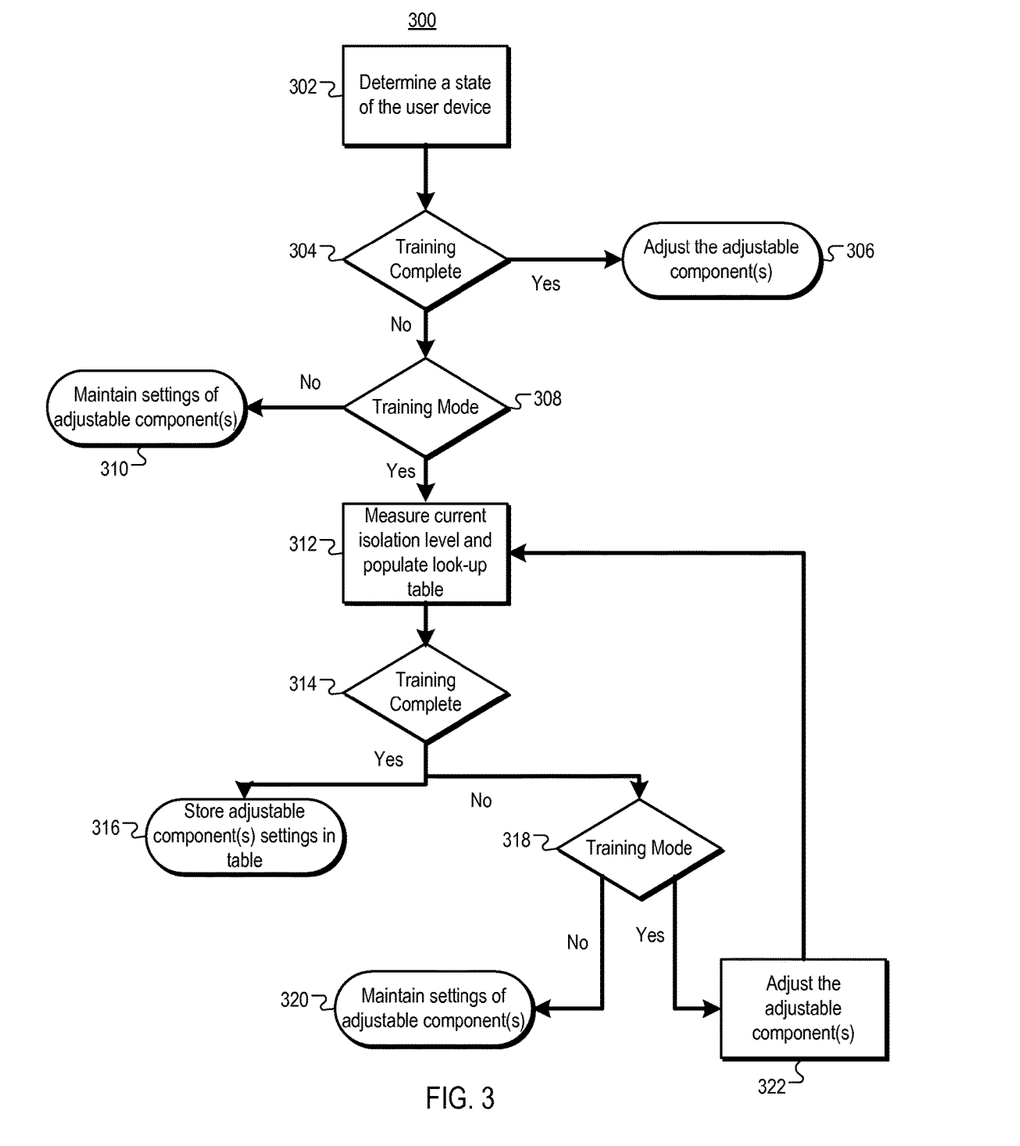
FIG. 3 is a flow diagram of an embodiment of a method of adjusting a resistance and reactance of an adaptive neutralization line according to one embodiment.

FIG. 3 is a flow diagram of an embodiment of a method 300 adjusting a resistance and reactance of an adaptive neutralization line according to one embodiment. In method 300, a user device can include a first antenna and a second antenna connected together by the adaptive neutralization line. The method can begin with the controller determining a state or environment that the user device may be operating in (block 302). In one example, the user device can initiate the determining of the state based on a state triggering event. In one example, the state triggering event can be when a sensor of the user device detects that the user device is in a predetermined state as discussed in the preceding paragraphs. In another example, the state triggering event can be a change in states of the user device. For example, the controller can determine a current state of the user device and a state triggering event can be initiated when the controller identifies a change in the state of the user device. In another example, the state triggering event can be when a predetermined period of time has passed (e.g., on a periodic basic) periodically. For example, the controller can operate in the background to adjust the variable components of an adaptive neutralization line at fixed intervals while the user device may be performing typical or normal operations.

The controller can determine when training for the determined state has completed (block 304). The training for the determined state may be completed when a predetermined number of samples of the variable component(s) for each state have been taken by the controller. When the training has completed, the controller can adjust one or more variable component(s) of the adaptive neutralization line based on adjustment values of an adjustment table for the current state or environment (block 306). When the training has not completed, the controller can determine when the user device may be operating in a training mode (block 308). The training mode can be a mode where the user device iteratively takes isolation measurements and stores settings for a threshold number of isolation measurements. The user device may enter the training mode based on a training triggering event, where the training triggering event may include: a factory reset of the user device; an initial powering on of the user device (e.g., a new device powering on); a threshold period of time having passed; when a number of isolation level measurements taken by the controller may be below a threshold amount of measurements; or when the user device may be in an environment with one or more relatively strong signals.

When the user device may not be operating in a training mode, the controller can maintain current settings of the variable component(s) (block 310). When the user device may be operating in a training mode, the controller can measure an isolation level of the antennas of the user device for the current state and store current setting values of the variable component(s) in a settings table (block 312). When the controller measures the current isolation level, the controller can determine when the training mode has completed (block 314). When the training for the determined state has completed, the controller can store the current setting values of the variable component(s) in the settings table (block 316). When the training for the determined state may not have completed, the controller can determine when the user device may be in a training mode (block 318). When the user device may not be operating in the training mode, the controller can maintain the current settings of the variable component(s) (block 320). When the user device may be operating in the training mode, the controller can adjust the one or more variable component(s) of the adaptive neutralization line (block 322). In one example the controller can randomly adjust the one or more variable component(s). In another example the controller can adjust the one or more variable component(s) using a variation amount (such as a predetermine variation amount) for one or more of the variable component(s). In another example, the controller can avoid using one or more predetermined settings when adjusting the one or more variable component(s).

In another embodiment, the controller can determine when the look-up table does not contain an entry for the current state, e.g., determine that training for the current state has not been completed previously. When the look-up table does not contain the entry, the controller can iteratively measure a current isolation level between the first antenna and the second antenna while varying the first set of settings. The controller determines the second set of settings from the current isolation levels iteratively measured and stores the current isolation level and the second set of isolation for the current state into the look-up table. In a further embodiment, the controller varies the first set of settings by varying at least one of a length of the variable transmission line or a component value of the variable component.

In another embodiment, the controller determines that the look-up table contains an entry for the current state, e.g., that the electronic device is not in the training mode and maintains the first set of settings for the current state. In one implementation, the electronic device begins to iteratively measure the current isolation when a factory reset of the electronic device occurs, an initial powering of the electronic device occurs, a threshold period of time passes, the current isolation level is below a threshold amount, the electronic device is located in an environment where signal strengths of broadcast signals exceed a threshold level, or the like.

Figure 4:
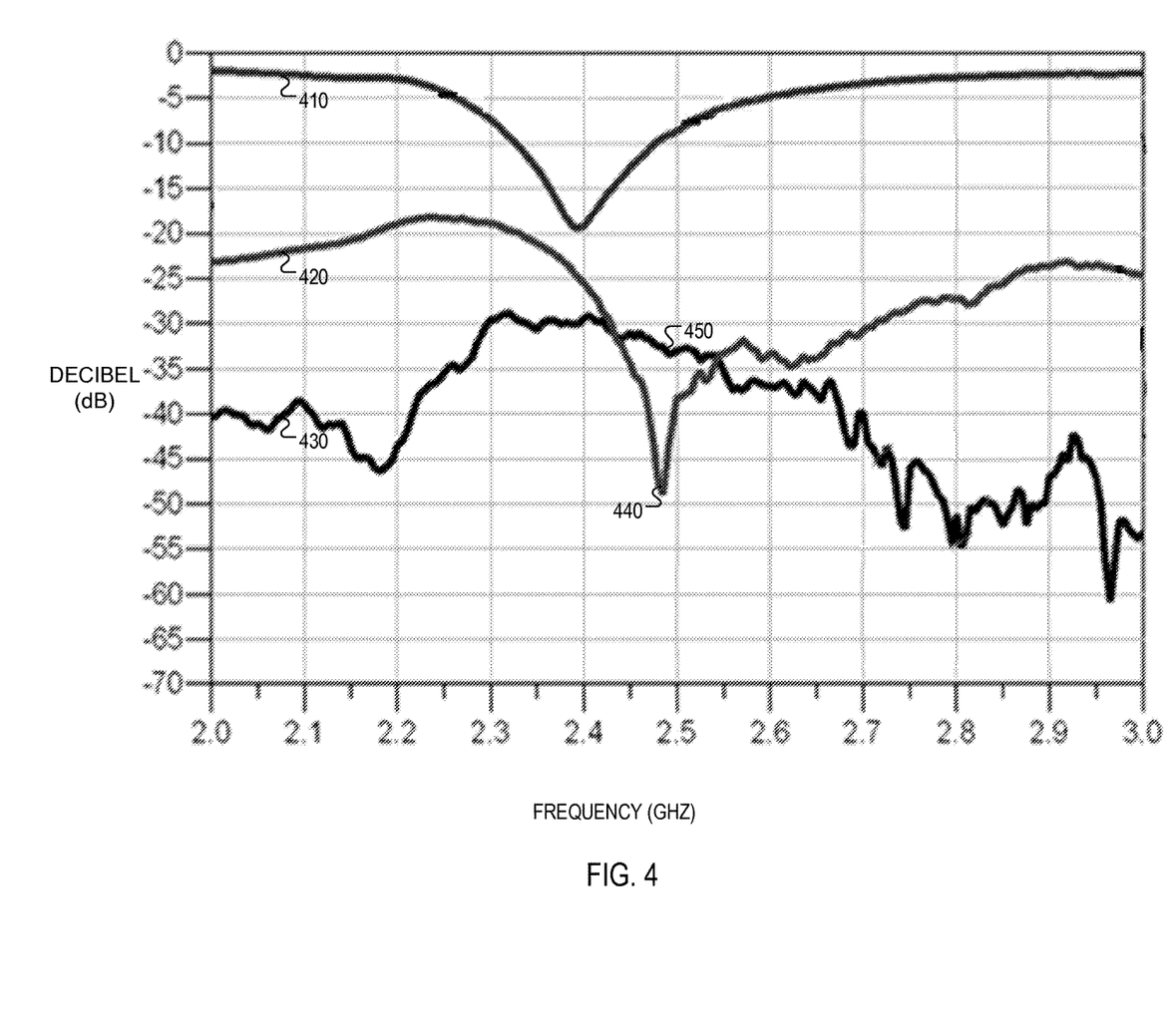
FIG. 4 illustrates a graph of return loss and measured isolation for a user device configured to communicate on a communication band according to one embodiment.

FIG. 4 illustrates a graph of return loss and measured isolation for a user device configured to communicate on a communication band according to one embodiment. The user device can include antennas with various adaptive neutralization line configurations. Line 410 shows a return loss for a user device with antennas configured with the adaptive neutralization line, as discussed in the preceding paragraphs. Line 420 shows a measured isolation level of the antennas of the user device when the user device may be configured with the adaptive neutralization line, as discussed in the preceding paragraphs. Line 430 shows a measured isolation level of the antennas of the user device when the user device may not be configured with the adaptive neutralization line. In one example, the user device may communication information to another device using a communication band of 2.4 GHz to 2.5 GHz. At the communication band of 2.4 GHz to 2.5 GHz, the user device with the antennas configured with the adaptive neutralization line shows an isolation level of approximately −48 db (point 440) and the user device with the antennas configured without the adaptive neutralization line shows an isolation level of approximately −33 db (point 450). As the isolation level of the user device decreases, the interference and distortion between the antennas decreases.

Figure 5A:
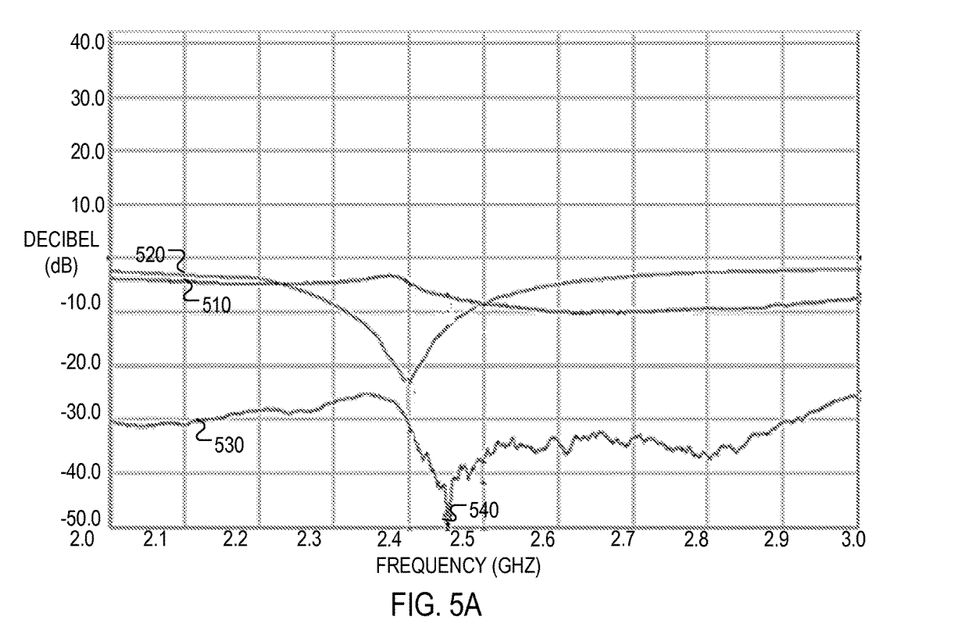
FIG. 5A illustrates a graph of a user device operating in an environment free of interfering objects according to one embodiment.
Figure 5B:
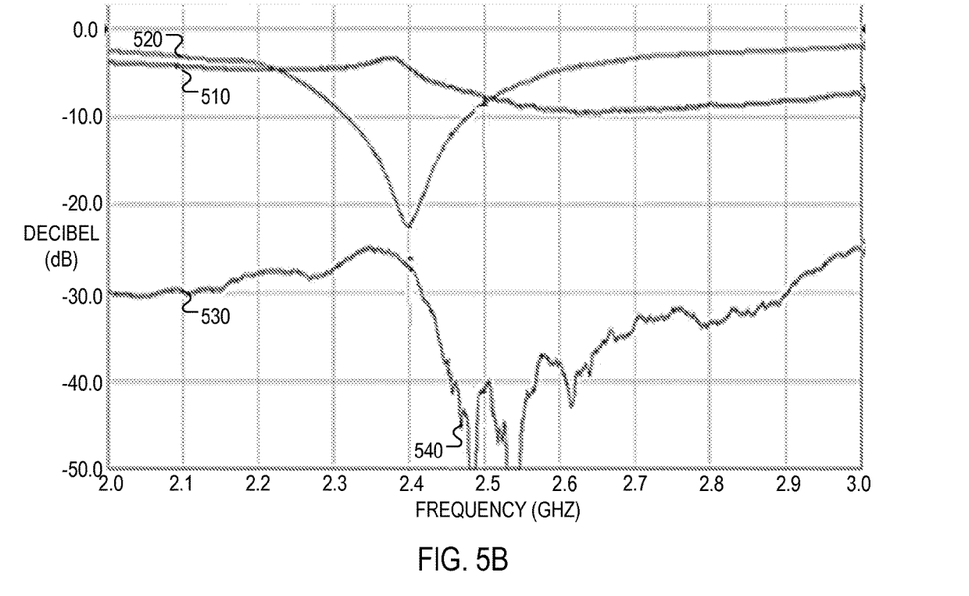
FIG. 5B illustrates a graph of a user device operating in an environment with an interfering object according to one embodiment.

FIGS. 5A and 5B illustrates graphs of return loss and measured isolation for a user device with a first antenna and a second antenna configured to communicate on a communication band between 2.4 GHz and 2.5 GHz in different environments. An adaptive neutralization line can couple the first antenna to the second antenna. FIG. 5A illustrates the user device with a first antenna and a second antenna operating in an environment free of interfering objects (such as metal objects) according to one embodiment. Line 510 shows the return loss of the first antenna with the adaptive neutralization line, as discussed in the preceding paragraphs. Line 520 shows a return loss of the second antenna configured with the adaptive neutralization line, as discussed in the preceding paragraphs. Line 530 shows a measured isolation level for the first antenna and the second antenna of the user device when the user device may be configured with the adaptive neutralization line, as discussed in the preceding paragraphs. At the communication band of 2.4 GHz to 2.5 GHz, the user device with the antennas configured with the adaptive neutralization line shows an isolation level of approximately −50 db (point 540).

FIG. 5B illustrates the user device operating in an environment with an interfering object (such as metal object) according to one embodiment. Line 510 shows a return loss of the first antenna configured with the adaptive neutralization line, as discussed in the preceding paragraphs. Line 520 shows a return loss of the second antenna with the adaptive neutralization line, as discussed in the preceding paragraphs. Line 530 shows a measured isolation level between the first antenna and the second antenna when the user device may be configured with the adaptive neutralization line, as discussed in the preceding paragraphs. However, the center frequency at which the isolation level reaches approximately −50 db (point 540) for a user device with an adaptive neutralization line shifts from a center frequency of approximately 2.45 GHz as in FIG. 5A to a center frequency of approximately 2.49 GHz in FIG. 5B.

In response to the center frequency shifting for the various environments, the controller can adjust the variable components of the adaptive neutralization line to shift the center frequency back to a desired frequency (e.g., 2.45 GHz). In one example, the controller can shift the center frequency for the desired isolation level back to the desired frequency by adjusting a length of the adaptive neutralization line using a variable resistor, a variable inductor, and/or a variable capacitor of the adaptive neutralization line. For example, the controller can increase or decrease a resistance of the variable resistor, increase or decrease a inductance of the variable inductor, and/or increase or decrease a capacitance of the variable capacitor. In another example, the controller can change a depth of the isolation level by maintaining the length of the adaptive neutralization line while changing values of the variable resistor, the variable inductor, and/or the variable capacitor. For example, the controller can increase or decrease a resistance of the variable resistor, increase or decrease a inductance of the variable inductor, and/or increase or decrease a capacitance of the variable capacitor.

Figure 6:
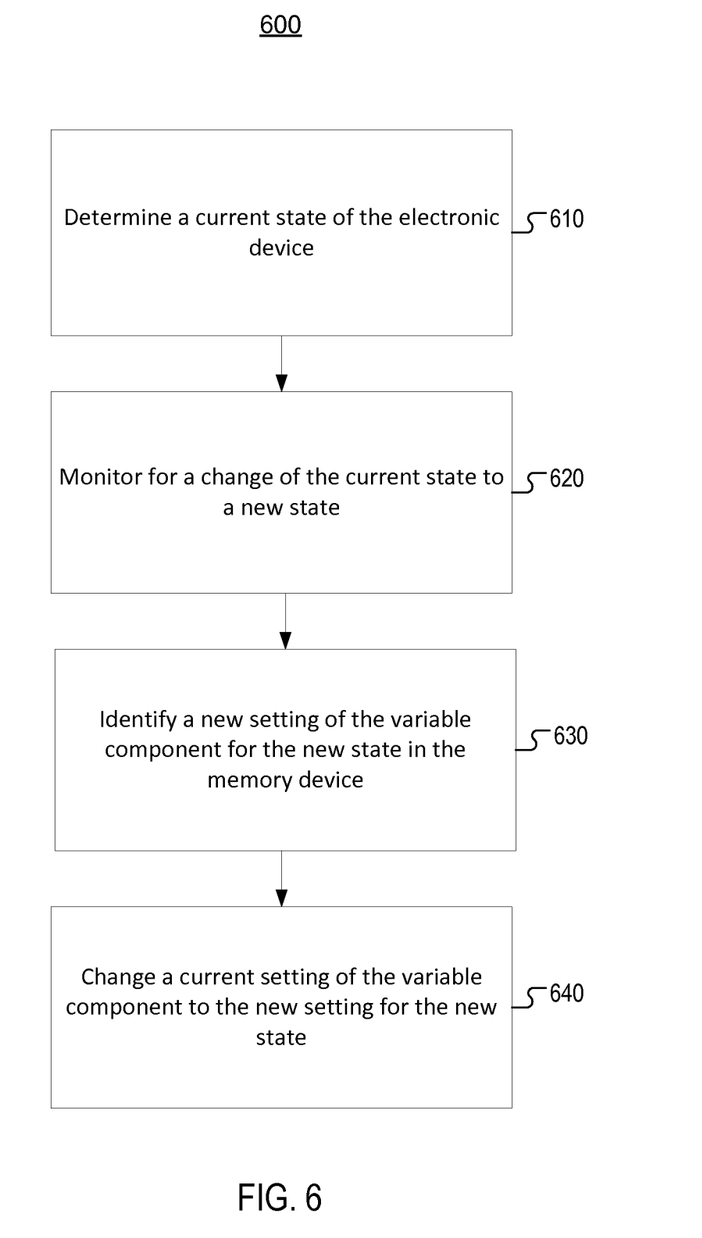
FIG. 6 is a flow diagram of an electronic device configured to change variable settings of an adaptive neutralization line according to one embodiment.

FIG. 6 is a flow diagram 600 of an electronic device configured to change settings of an adaptive neutralization line according to one embodiment. The electronic device can include: a first antenna, a second antenna, an adaptive neutralization line coupled between the first antenna and the second antenna, a sensor, and a controller. The adaptive neutralization line can include a variable component and a transmission line. The sensor can be configured to take a measurement of the electronic device. The controller can be coupled to the adaptive neutralization line. The controller can be configured to determine a current state of the electronic device (block 610). The controller can further be configured to monitor for a change of the current state to a new state (block 620). The controller can further be configured to identify a new setting of the variable component for the new state in the memory device (block 630). The controller can further be configured to change a current setting of the variable component to the new setting for the new state (block 640).

In another embodiment, the controller can be configured to detect an environmental condition that causes a first coupling value (such as an original coupling) increase to a second coupling value. Environmental conditions can be conditions, influences, or external factors approximate the first antenna or the second antenna. The original coupling, also referred to as a natural coupling, is the coupling that occurs when the first antenna and the second antenna are operating within a threshold distance from each other to cause mutual coupling. Original coupling occurs when there is no neutralization line present between the two antennas or when the adaptive neutralization line, as described herein, is not being used. Some environmental conditions may cause the original coupling to increase, but the embodiments of the adaptive neutralization line as described herein may be used, according to the environmental conditions, to adjust, reduce, or remove the original coupling. The controller adjusts a value of the variable component to change a resistance value or a reactance value, or both of the adaptive neutralization line to achieve a third coupling value that is lower than the second coupling value. The third coupling value can improve antenna-to-antenna isolation between the first antenna and the second antenna in the environmental condition. In some embodiments, the adaptive neutralization line includes a transmission line and multiple discrete components selectively coupled to the transmission line. The controller can send control signals to the adaptive neutralization line to adjust the resistance and reactance of the adaptive neutralization line by selecting different combinations of the multiple discrete components to the transmission line. For example, the components may be discrete or variable inductors, discrete or variable capacitors, or any combination thereof. These inductors and capacitors can be switched into the transmission line to alter a line length of the transmission line. In some cases the controller can alter the line length by which combination is switched in and/or altering values of the variable inductor(s), variable capacitor(s), or both. In other embodiments, the adaptive neutralization line includes a transmission line and multiple variable components coupled to the transmission line. The controller can send control signals to the adaptive neutralization line to adjust the resistance and reactance of the adaptive neutralization line by selecting a different combination of component values for the multiple variable components. For example, the variable components may be variable resistors, variable inductors, variable capacitors, or any combination thereof. The controller may adjust the resistance and reactance by changing the components values for the same length of transmission line.

In another embodiment, the controller periodically measures the antenna-to-antenna isolation and adjusts a resistance and reactance of the adaptive neutralization line, adjusts the variable component of the adaptive neutralization line, or both when the antenna-to-antenna isolation falls below a threshold value.

In another embodiment, the controller periodically determines a current state of the device from among multiple states stored in memory. The multiple states represent different environmental conditions. Each respective state includes a set of stored isolation parameters. The controller determines that the current state of the device has changed from a different state, identifies the respective set of stored isolation parameters for the current state and sends control signals to the adaptive neutralization line to apply the respective set of stored isolation parameters to the adaptive neutralization line for the current state.

In a further embodiment, a sensor is used to take a measurement of the radio device. The sensor may be any one of an optical sensor; an accelerometer; a clock; a timer; a temperature sensor; a pressure sensor; a touch sensor; a location sensor; a frequency sensor; a gyroscope; a grip sensor; an audio sensor, or the like.

In some embodiments, the environmental conditions may be various types of conditions. For example, the environmental condition may be an environment that the radio device operates in; a condition in which the radio device operates adjacent to a metallic object; a condition where the radio device moves from a location; a condition in which the radio deice operates in a vertically upright position; a condition in which the radio device operates in proximity adjacent to a user, or the like.

Figure 7:
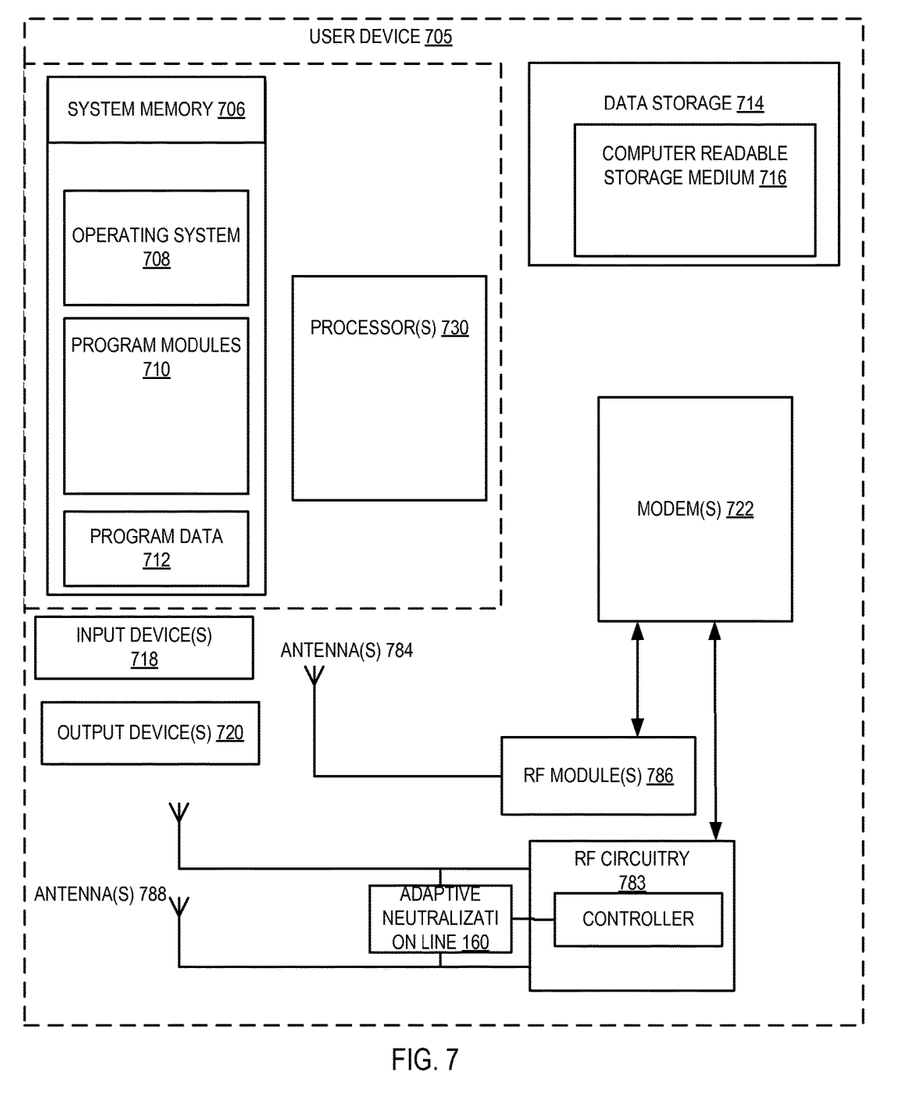
FIG. 7 is a block diagram of a user device in which embodiments of a radio device with an adaptive neutralization line may be implemented.

FIG. 7 is a block diagram of a user device 705 in which embodiments of a radio device with an adaptive neutralization line may be implemented. The user device 705 may correspond to the user device of FIGS. 1A-1D. The user device 705 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 705 may be any portable or stationary user device. For example, the user device 705 may be an intelligent voice control and speaker system. Alternatively, the user device 705 can be any other device used in a WLAN network (e.g., Wi-Fi® network), a WAN network, or the like.

The user device 705 includes one or more processor(s) 730, such as one or more CPUs, microcontrollers, field programmable gate arrays, or other types of processors. The user device 705 also includes system memory 706, which may correspond to any combination of volatile and/or non-volatile storage mechanisms. The system memory 706 stores information that provides operating system component 708, various program modules 710, program data 712, and/or other components. In one embodiment, the system memory 706 stores instructions of the method 300 and 600 as described herein. The user device 705 performs functions by using the processor(s) 730 to execute instructions provided by the system memory 706.

The user device 705 also includes a data storage device 714 that may be composed of one or more types of removable storage and/or one or more types of non-removable storage. The data storage device 714 includes a computer-readable storage medium 716 on which is stored one or more sets of instructions embodying any of the methodologies or functions described herein. Instructions for the program modules 710 may reside, completely or at least partially, within the computer-readable storage medium 716, system memory 706 and/or within the processor(s) 730 during execution thereof by the user device 705, the system memory 706 and the processor(s) 730 also constituting computer-readable media. The user device 705 may also include one or more input devices 718 (keyboard, mouse device, specialized selection keys, etc.) and one or more output devices 720 (displays, printers, audio output mechanisms, etc.).

The user device 705 further includes a modem 722 to allow the user device 705 to communicate via a wireless network (e.g., such as provided by the wireless communication system) with other computing devices, such as remote computers, an item providing system, and so forth. The modem 722 can be connected to RF circuitry 783 and zero or more RF modules 786. The RF circuit 783 may include a controller 785, as described herein. An adaptive neutralization line 787, as described herein is coupled between the antennas 788 and is coupled to the controller 783. The controller 783 controls the adaptive neutralization line 160 to reduce the mutual coupling between the antennas 788, which increase isolation between the antennas 788 as described herein. The RF circuitry 783 may be a WLAN module, a WAN module, PAN module, or the like. Antennas 788 are coupled to the RF circuitry 783, which is coupled to the modem 722. Zero or more antennas 784 can be coupled to one or more RF modules 786, which are also connected to the modem 722. The zero or more antennas 784 may be GPS antennas, NFC antennas, other WAN antennas, WLAN or PAN antennas, or the like. The modem 722 allows the user device 705 to handle both voice and non-voice communications (such as communications for text messages, multimedia messages, media downloads, web browsing, etc.) with a wireless communication system. The modem 722 may provide network connectivity using any type of mobile network technology including, for example, cellular digital packet data (CDPD), general packet radio service (GPRS), EDGE, universal mobile telecommunications system (UMTS), 1 times radio transmission technology (1xRTT), evaluation data optimized (EVDO), high-speed down-link packet access (HSDPA), Wi-Fi®, Long Term Evolution (LTE) and LTE Advanced (sometimes generally referred to as 4G), etc.

The modem 722 may generate signals and send these signals to antenna 788, and 784 via RF circuitry 783 and RF module(s) 786 as descried herein. User device 705 may additionally include a WLAN module, a GPS receiver, a PAN transceiver and/or other RF modules. These RF modules may additionally or alternatively be connected to one or more of antennas 784, 788. Antennas 784, 788 may be configured to transmit in different frequency bands and/or using different wireless communication protocols. The antennas 784, 788 may be directional, omnidirectional, or non-directional antennas. In addition to sending data, antennas 784, 788 may also receive data, which is sent to appropriate RF modules connected to the antennas.

In one embodiment, the user device 705 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 722 is shown to control transmission and reception via antenna (784, 888), the user device 705 may alternatively include multiple modems, each of which is configured to transmit/receive data via a different antenna and/or wireless transmission protocol.

The user device 705 delivers and/or receives items, upgrades, and/or other information via the network. For example, the user device 705 may download or receive items from an item providing system. The item providing system receives various requests, instructions and other data from the user device 705 via the network. The item providing system may include one or more machines (e.g., one or more server computer systems, routers, gateways, etc.) that have processing and storage capabilities to provide the above functionality. Communication between the item providing system and the user device 705 may be enabled via any communication infrastructure. One example of such an infrastructure includes a combination of a wide area network (WAN) and wireless infrastructure, which allows a user to use the user device 705 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 705.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 705 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 805 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A radio device comprising:
    a neutralization line coupled between a first antenna and a second antenna, wherein the neutralization line comprises a variable component, the first and the second antennas being electromagnetically coupled and having a first isolation level;
    a controller coupled to the first antenna, the second antenna, and the neutralization line;
    a sensor coupled to the controller, wherein the controller is configured to:
        determine a first signal strength of a first signal received at the second antenna using the sensor;
        determine the first isolation level between the first antenna and the second antenna using the first signal strength, wherein the first isolation level is indicative of an environmental condition in which the radio device operates;
        determine a second signal strength of a second signal received at the second antenna using the sensor;
        determine a second isolation level between the first antenna and the second antenna using the second signal strength, wherein the second isolation level is indicative of a change in the environmental condition in which the radio device operates;
        determine that the second isolation level falls below a threshold value;
        identify an isolation parameter corresponding to the change in the environmental condition; and
        adjust a value of the variable component in view of the isolation parameter to change a resistance value or a reactance value, or both of the neutralization line to increase the second isolation level to a third isolation level that is above the threshold value.

2. The radio device of claim 1, further comprising a first variable component and a second variable component and wherein the neutralization line comprises:
    a transmission line, and wherein to change the reactance value, the resistance value, or both the controller is further configured to:
    selectively couple either the first variable component or the second variable component to the transmission line or both to the transmission line.

3. The radio device of claim 2, wherein the first variable component comprises a variable inductor and the second variable component comprises a variable capacitor, and wherein the controller is configured to adjust the resistance value and reactance value by altering a line length of the transmission line using the variable inductor and the variable capacitor.

4. The radio device of claim 1, wherein the neutralization line comprises:
    a transmission line; and
    a first variable component and a second variable component coupled to the transmission line, wherein to change the reactance value, or the resistance value, or both, the controller is further configured to:
    vary a first value of the first variable component and/or a second value of the second variable component.

5. The radio device of claim 4, wherein the first variable component and the second variable component comprise one of a variable resistor, a variable inductor, or a variable capacitor.

6. The radio device of claim 1, wherein the controller is further configured to:
periodically measure the second isolation level; and
adjust the at least one of the resistance or the reactance of the neutralization line or the variable component of the neutralization line when the second isolation level falls below the threshold value.

7. The radio device of claim 1, wherein the controller is further configured to:
periodically determine a current state of the device, wherein a plurality of states represent different environmental conditions, and wherein a respective state of the plurality of states has an associated set of stored isolation parameters;
identify the respective set of stored isolation parameters for the current state; and
use the respective set of stored isolation parameters to adjust the reactance value, or the resistance value, or both of the neutralization line for the current state.

8. The radio device of claim 7, wherein the sensor comprises: an optical sensor; an accelerometer; a clock; a timer; a temperature sensor; a pressure sensor; a touch sensor; a location sensor; a frequency sensor; a gyroscope; a grip sensor; or an audio sensor.

9. The radio device of claim 1, wherein the environmental condition is at least one of: an environment that the radio device operates in; a condition in which the radio device operates adjacent to a metallic object; a condition where the radio device moves from a location; a condition in which the radio device operates in a vertically upright position; or a condition in which the radio device operates in proximity to a user.

10. An electronic device comprising:
a memory device;
a first antenna and a second antenna;
a neutralization line coupled between the first antenna and the second antenna; wherein the neutralization line comprises a variable component;
a controller coupled to the neutralization line and coupled to the memory device, a sensor coupled to the controller, wherein the controller is configured to:
determine a first signal strength of a signal received at the second antenna using the sensor;
determine an isolation level between the first antenna and the second antenna using the first signal strength, wherein the isolation level is indicative of a environmental state in which the electronic device operates;
monitor for a change from the first signal strength to a second signal strength for the signal, wherein the change in the first signal strength to the second signal strength is indicative of a change in the environmental state in which the electronic device operates;
determine that the isolation level falls below a threshold value;
identify a new setting corresponding to the change in the environmental state for the variable component; and
change a current setting of the variable component to the new setting to increase the isolation level between the first antenna and the second antenna above the threshold value.

11. The electronic device of claim 10, further comprising:
a transceiver configured to communicate data using at least one of the first antenna or the second antenna; and
the sensor configured to take a measurement of the electronic device, wherein the controller is configured to use the measurement to determine the environmental state of the electronic device.

12. The electronic device of claim 10, wherein the controller is further configured to change the current setting of the variable component to the new setting to maintain the isolation level between the first antenna and the second antenna at or above the threshold value.

13. The electronic device of claim 12, wherein the threshold value is:
a predetermined isolation level; or
an adjustable isolation level based on user defined parameters.

14. The electronic device of claim 10, wherein the controller is further configured to adjust at least one of a location of a null of the neutralization line or a depth of the null of the neutralization line.

15. The electronic device of claim 10, detect a condition that causes the environmental state to change to a new state, wherein the condition is at least one of: an environment that the electronic device operates in; a condition in which the electronic device operates adjacent to a metallic object; a condition where the electronic device moves from a location; a condition in which the electronic device operates in a vertically upright position; or a condition in which the electronic device operates in proximity to a user.

16. The electronic device of claim 10, wherein the controller is further configured to:
periodically measure isolation level; and
adjust at least one of a resistance and reactance of the neutralization line or the variable component of the neutralization line when the isolation level falls below the threshold value.

17. An electronic device comprising:
a memory device to store data;
a first antenna and a second antenna;
an adaptive neutralization line coupled between the first antenna and the second antenna, wherein the adaptive neutralization line comprises a variable transmission line and a variable component set for a previous state of the electronic device according to a first set of variable settings for the variable transmission line and the variable component;
a controller coupled to the adaptive neutralization line and the memory device, wherein the controller is configured to:
determine a current state of the electronic device using measurements taken by a plurality of sensors;
determine that the current state is different than the previous state;
search for an entry corresponding to the current state in a look-up table stored in the memory device, wherein:
when the look-up table does not contain the entry for the current state, the controller is further configured to:
iteratively measure a current isolation level between the first antenna and the second antenna while varying the first set of variable settings based on the current isolation level;
set a second set of variable settings for the current state when the current isolation level enters a threshold isolation level range; and store the current isolation level and the second set of variable settings for the current state into the look-up table; and when the look-up table contains an entry for the current state, the controller is further configured to:

determine, from the entry for the current state, the second set of variable settings to reconfigure the adaptive neutralization line for the current state; and change the first set of variable settings for the variable transmission line and the variable component of the adaptive neutralization line to the second set of variable settings.

18. The electronic device of claim 17, wherein the electronic device begins iteratively measuring the current isolation based on:

determining that the electronic device has been reset;

an initial powering of the electronic device;

expiration of a threshold period of time;

determining that the current isolation level is below a threshold amount; or determining that the electronic device is located in an environment where signal strengths of broadcast signals exceed the threshold level.

19. The electronic device of claim 17, wherein the first set of variable settings comprises at least one a first resistance value, a first inductance value, or a first capacitance value for the variable component.

* * * * *